J. A. P. CRISFIELD.
AIR VALVE FOR WATER GAS APPARATUS.
APPLICATION FILED APR. 27, 1915.

1,206,307.

Patented Nov. 28, 1916.

WITNESS:
R. M. Kitchel

INVENTOR
James A. P. Crisfield
BY
Augustus B. Stoughton
ATTORNEY.

UNITED STATES PATENT OFFICE.

JAMES A. P. CRISFIELD, OF PHILADELPHIA, PENNSYLVANIA, ASSIGNOR TO THE UNITED GAS IMPROVEMENT COMPANY, OF PHILADELPHIA, PENNSYLVANIA, A CORPORATION OF PENNSYLVANIA.

AIR-VALVE FOR WATER-GAS APPARATUS.

1,206,307.　　　　　Specification of Letters Patent.　　Patented Nov. 28, 1916.

Application filed April 27, 1915. Serial No. 24,355.

*To all whom it may concern:*

Be it known that I, JAMES A. P. CRISFIELD, a citizen of the United States, and a resident of Philadelphia, in the county of Philadelphia and State of Pennsylvania, have invented certain new and useful Improvements in Air-Valves for Water-Gas Apparatus, of which the following is a specification.

In apparatus for the manufacture of gas there is a gas generator and an air pipe leading to the generator and this air pipe is provided with a valve which when opened admits air to the generator and which when closed is intended to exclude gas generated in the generator from reaching the air pipe or line. If this valve is not tight, gas from the generator leaks past it into the air line mingling with the air and forming a mixture which is explosive and sometimes explodes.

The principal object of the present invention is to provide an air valve for gas apparatus which will avoid the above mentioned defects and disadvantages and which will leak gas, if at all, not into the air line but outside of the valve casing, for example, into the atmosphere.

Another object of the invention is to provide for permitting the air to keep the dust cleaned out of the bottom of the valve, and another object of the invention is to provide a telltale for indicating leakage of the gas side of the valve.

To these and other ends hereinafter set forth the invention stated in general terms comprises an air valve for gas apparatus consisting of the combination of a valve casing, a valve structure slidable in the casing and comprising spaced gates or disks and their complemental interposed wedge-mechanism, and a spring closed released valve communicating with the interior of the casing between the valves or disks and disposed in the path of travel of the valve structure to be opened thereby as the air valve is closed.

The invention further comprises the improvements to be presently described and finally claimed.

In the accompanying drawings I have illustrated an embodiment of the invention in application to one form of air valve, not intending thereby to limit its use to that particular type of air valve.

Figures 1, 2:
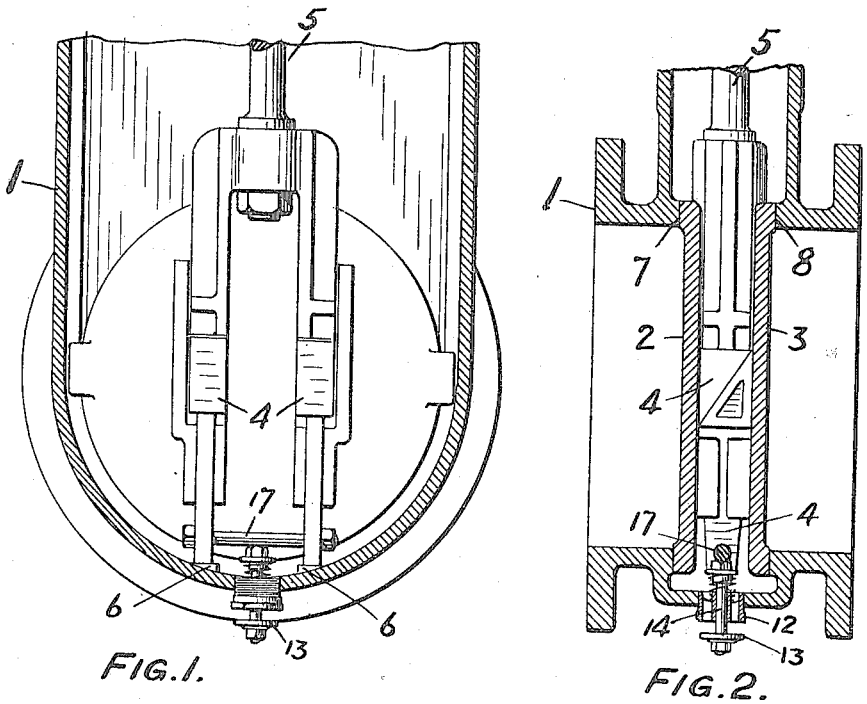
Figure 3:
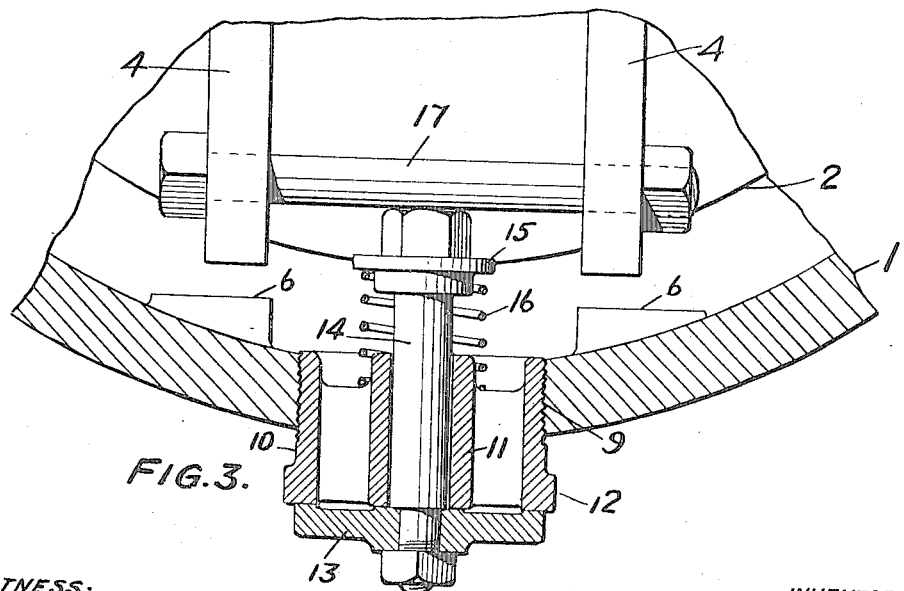

In the drawings Figure 1, is a cross-sectional view of an air valve for gas apparatus embodying or containing features of the invention. Fig. 2, is a sectional view of the same, and Fig. 3, is an enlarged sectional view illustrating details of construction.

In the drawings 1 is a valve casing within which there is slidably arranged a valve structure comprising spaced gates or disks 2 and 3, and wedge-mechanism 4 interposed between them. There is nothing new about this construction and arrangement and the form of it illustrated is chosen from among other well known forms merely for the sake of description. When the valve structure is lifted, as by means of the spindle 5, the wedge mechanism does not exert pressure on the gates 2 and 3 and the whole valve structure is lifted up into the bonnet of the casing so as to clear the fluid-way. When the valve structure is lowered, the wedge-mechanism 4 abuts on the seats 6, thus causing it to operate to spread the gates or disks against their seats 7 and 8.

Having thus described the construction and mode of operation of one type of air valve which is useful in connection with my invention, I will now proceed to describe the latter in connection with that air valve.

An aperture 9 of ample size is made in the bottom of the casing and between the valves or disks 2 and 3. Into this aperture there is screwed a fitting 10 provided with a spider 11 and with a squared portion 12 adapted for the reception of a wrench or like tool.

13 is a valve plate or disk adapted to seat on the fitting 10. This relief valve 13 is carried by a post 14 movable in the spider and having a head 15 between which and the spider, a spiral spring 16 is interposed. The spring 16 tends to keep the relief valve 13 closed and its strength must be such as to prevent the relief valve from opening under a pressure lower than is appropriate. For example, this relief valve should not open under a lower pressure than two pounds to the square inch.

17 is a bolt connected with the wedge-mechanism 4 and arranged in line with the head 15. The bolt 17 is so positioned that it will collide with the head 15 as the valve structure descends so as to open the relief valve 13 before the wedge-mechanism reaches its seat 6 and consequently before the disks or gates 2 and 3 are seated on their seats 7 and 8.

In use the result of opening the relief valve 13 before the valve structure is closed is to permit air to blow out through the relief valve and so clean the bottom of the valve casing and the face of the relief valve 13 of dust and the like. When the valve structure is closed and assuming that the gate or disk 3 is on the gas side and the gate or disk 2 is on the air side, any leakage of gas past the disk or gate 3 will escape through the openings in the spider and past the relief valve and so will not find its way past the valve or gate 2 and consequently cannot enter the air line, but will on the contrary be discharged through the relief valve either into the atmosphere where it will do no harm or into some appropriate offtake, not shown. Furthermore any gas passing out through the relief valve is visible and so acts as a telltale to indicate not only that the gas side of the valve is leaking but also to some extent the amount of the leakage.

It will be obvious to those skilled in the art to which the invention relates that modifications may be made in details of construction and arrangement without departing from the spirit of the invention, so that the latter is not limited in regard to such matters or further than the prior state of the art and the appended claim may require.

What I claim is:

An air valve for gas apparatus comprising the combination of a valve casing, a valve structure slidable in the casing and comprising spaced gates or disks and their complemental interposed wedge-mechanism, a fitting provided with a spider and inserted through the casing and located between said gates or disks, a relief valve coöperating with the outer end of the fitting and having a headed stem, a spring interposed between the head of the stem and the spider and tending to close the valve, and means carried by the wedge-mechanism and adapted to operate on said stem to open the relief valve.

In testimony whereof I have hereunto signed my name.

JAMES A. P. CRISFIELD.

Witnesses:
WALTER F. CHEWNING,
O. B. EVANS.

Copies of this patent may be obtained for five cents each, by addressing the "Commissioner of Patents, Washington, D. C."